Patented Mar. 3, 1953

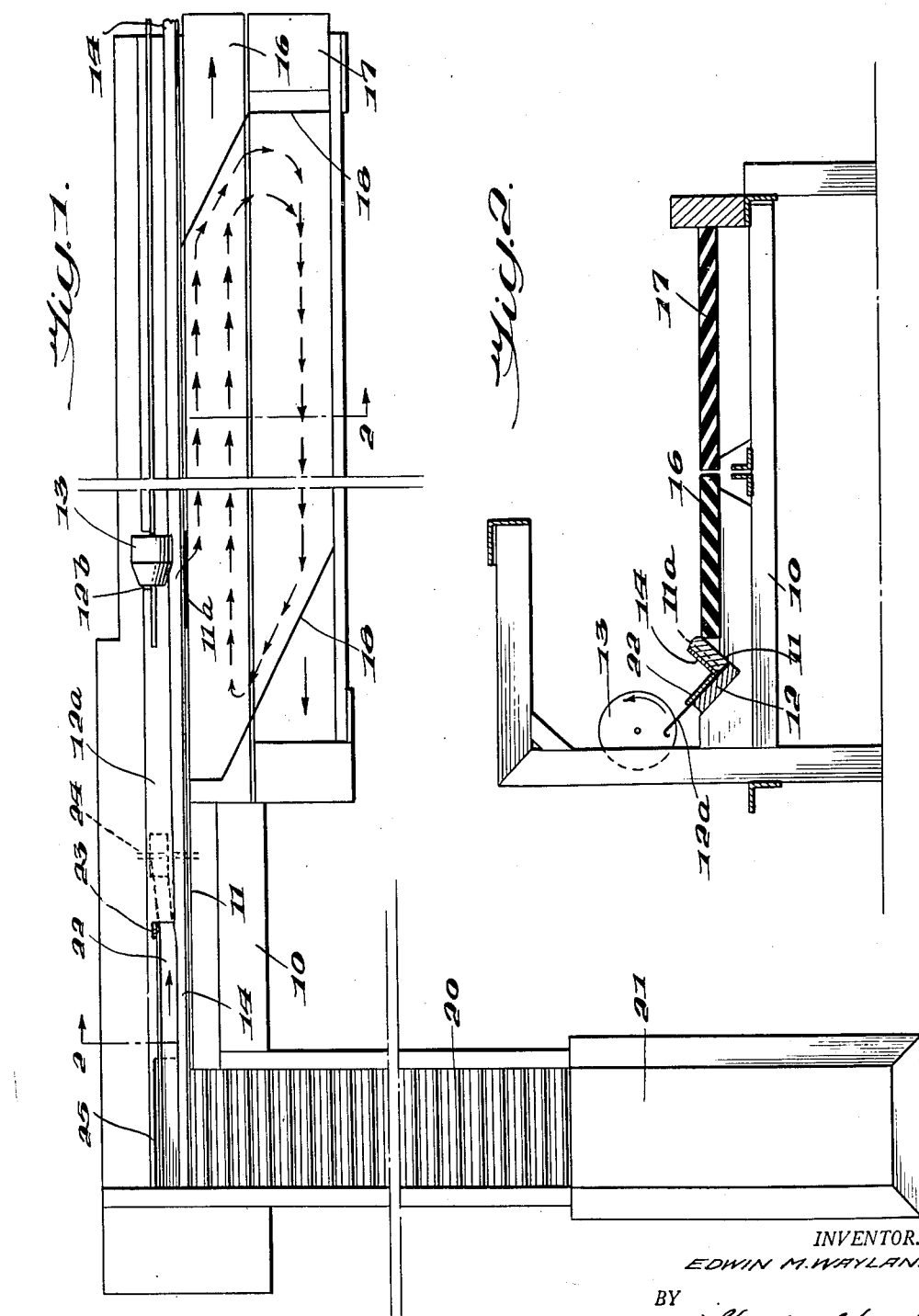

2,630,222

UNITED STATES PATENT OFFICE 2,630,222

FRUIT GRADING DEVICE

Edwin M. Wayland, Covesville, Va.

Application December 7, 1949, Serial No. 131,596

2 Claims. (Cl. 209—73)

This invention relates to fruit sizing methods and machines and aims generally to improve the same. It is particularly, but not exclusively, adapted to improve the type of machine utilizing a carrier trough provided with a fruit spinning belt and positive action means for ejecting fruit from such spinner belt. My earlier Patents No. 1,672,441, issued June 5, 1928; No. 1,673,172, issued June 12, 1928; No. 1,696,066, issued December 18, 1928; No. 1,706,368, issued March 19, 1929; No. 1,925,158, issued September 5, 1933; and No. 2,285,955, issued June 9, 1942 pertain to this type of machine, which is the preferred type of machine for sizing of apples and like fruits. As the word "fruit" applied to a species, is both singular and plural, for clarity herein, the words "apple" and "apples" are sometimes employed as synonymous with "fruit," where a distinction between the singular and plural is desired.

In machines of the aforesaid type a spinner-belt travels along one face, which may be termed the front face, of a V-shaped trough having its sides at right angles to each other; and most fruit, resting against the spinner-belt at one side, and on the stationary back of the trough at the other, is caused thereby to assume an "upedged" position with its periphery tangent to the spinner-belt and with its stem or calyx end contacting the back wall of the trough. In this position the motion of the belt imparts spinning motion to the fruit so that as it progresses along the trough, all of its transverse diameters are presented under the ejecting means with the result that the fruit is sorted out of the sizing trough if its largest transverse diameter is equal to or greater than the gauging distance between the ejector and the spinner belt. With a spinner-belt traveling at about 180 feet per minute and properly spinning the fruit in such known machines, the fruit should progress along the sizing trough at about 30 feet per minute, and in fairly equally spaced relation.

In machines of this type, the fruit is usually fed into the entrance end of the machine endwise along the trough, or from the side of the trough. In either case, but more particularly in the case of side-feeding, there is some tendency of the fruit to pile up at the entrance end of the trough. Such piling up, particularly when the machine is being heavily fed, is apt to jam two or three apples together so that they cannot spin, with the result that certain apples, particularly in the case of relatively flat apples short in their axial dimensions, travel down the trough riding flat against the spinner-belt. Under such circumstances, the non-spinning apples tend to travel at a rate approaching that of the spinner-belt and to collide with spinning fruit, and knock down such spinning fruit so that it also rides flat. If they continue to travel flatwise, such apples may pass under one or more of the ejectors without presenting their largest transverse diameters thereto.

In addition the failure of apples to start down the trough immediately causes following apples to fall against them, and causes additional rubbing of some of the apples against the trough back or the spinner-belt, tending to produce minor bruising or superficial burning or browning of areas of the skins of tender-skinned apples, detracting from their apparent quality. Moreover, with side feeding, tender-skinned apples striking the trough back where they enter the same may become slightly bruised from this cause, as well. Finally, especially when high friction spinner-belts are used, certain ones of odd-shaped apples such as Yorks tend to develop a sort of jogging motion on the belt and this slight bouncing up and down on the fixed back produces a further tendency toward local friction browning, and toward inaccuracy in sizing when such apples pass under the ejecting means.

With the foregoing and other difficulties in mind, the present invention has among its objects, severally and interpendently, to provide means associated with a sizing trough for assisting the spinner-belt in upedging the fruit and carrying it along the trough; to provide a sizing trough having a longitudinally moving back portion at substantially right angles to its spinner-belt and traveling at approximately one-third of the speed of the spinner-belt; to provide a sizing trough having means to positively advance the apples in upedged position and reduce the tendency of the spinner-belt to slide under them; to provide a method and apparatus in which the upedged apples are given a component of forward motion independently of that produced by the spinner-belt; to provide a method and apparatus in which the advancing motion of the upedged apples is accelerated, so that more positive and greater advancing speed of the apples is attained while in effect reducing the speed of tangential contact of the belt against the fruit and thereby enabling the fruit to settle more firmly against the spinner-belt and be more firmly and smoothly rotated thereby, and reducing tendency of the fruit to jog or bounce on the spinner-belt; to provide a method and apparatus in which the apples are progressively, rapidly and positively removed from the feeding zone with more uniform spinning about their core axes so that even heavy feeding and heavy lateral feeding does not produce clogging of the trough; to provide a sizing trough adapted for lateral feeding without danger of bruising tender-skinned apples against the back board; and to provide details of construction and arrangements of parts contributing to the attainment of the aforesaid and other objects. The invention itself consists in the novel steps, features and combinations herein disclosed and defined in the appended claims.

In the accompanying drawings of an illustrative embodiment of the invention:

Fig. 1 is a diagrammatic plan view of a side-fed apple-sizing machine embodying one form of the invention.

Fig. 2 is a more or less diagrammatic offset transverse section taken on the line 2—2 of Fig. 1 looking in the direction indicated by the arrows thereon.

In its general aspects, the present invention provides a method of handling the fruit being sized which consists in advancing and reversely spinning the fruit about its core axis while simultaneously imparting to it a second or accelerating component of advancing movement. The method is preferably practiced by supporting the fruit on two surfaces at right angles to each other both moving in the direction of advance with one of the surfaces preferably moving several times as fast as the other.

Referring to the drawings of the illustrative embodiment, the type of machine shown therein comprises a frame 10 supporting a sizing trough made up of a front member 11 and a back member 12. The front member 11 in the form shown is of wood and may be cut away, as at 11a, under the ejectors or sizing wheels 13, for providing anti-pinching means in accordance with my prior Patents No. 1,672,441 and No. 1,925,158. The back member 12 may have any suitable form, as exemplified in said prior patents, for instance. In the form shown, and without limitation thereto, it comprises a relatively low wooden member, on the face of which may be mounted a stainless steel or other non-corroding anti-friction surface 12a. The upper edge of the back member, 12—12a herein, may extend to a height of about four inches from the trough bottom, and may be cut away in proximity to the sizing rolls 13 to provide clearance, as indicated at 12b.

The sizing belt 14, herein usually termed the spinner belt, travels on the inner face of the trough front 11 in the conventional manner, passing over conventional belt pulleys (not shown) at the ends of its run, and having its return run (not shown) in any suitable position, and constitutes one of the moving surfaces above mentioned.

The ejectors or sizing wheels 13 may be of any suitable form, as illustrated, for example, in any of my above-mentioned patents, but preferably are of the high-friction tapered inlet forms shown in my Patents No. 2,285,955 and No. 1,925,158, and preferably are provided with a suitable adjusting means (not shown) similar to the adjusting means shown in my Patents No. 1,673,172 and No. 2,285,955. Certain ones, or each, of the ejectors 13 may be preceded by upedging means of suitable form; for example, the brush means of my prior Patent No. 1,696,066 may be employed, or any alternative form.

Suitable means may also be provided to receive the sized fruit ejected at the several ejector stations, which may take the form of conventional bins, or may take the form of bins bottomed by distributing belts 16 and 17 supported on suitable belt pulleys and moving in opposite directions, to distribute the ejected fruit over a relatively long bin front to accommodate a desired number of packers. The several bin-separating partitions 18 may be made longitudinally adjustable to vary the sizes of the bins, but this provision forms no part of the present invention. In the form shown in Fig. 1, the sizing trough 11—12 is side-fed at its entrance end by a roller conveyor 20 leading from any suitable source of apples, such as a receiving or sorting table 21.

In accordance with the present invention, the back wall 12—12a of the sizing trough is provided at its entrance end with a second moving surface or booster belt 22. In the form shown, this belt passes from the trough through a slot 23 at its forward end and is supported on belt pulleys, one of which is indicated at 24, preferably below the level of the trough. In the form shown the pulley 24 is mounted on a horizontal axis and the belt 22 twists to engage the same after leaving the supporting wall of the trough. This same horizontal axis type of pulley mounting may be used at both ends of the booster belt 22 and at both ends of spinner-belt 14 if desired. The pulleys toward which the trough-supported runs of the belt are drawn are preferably the driven pulleys, as this maintains tightness of the trough runs of the belts, and suitable belt-tightening means (not shown) may be provided, if desired.

In accordance with the present invention, the booster belt 22 is desirably driven at a speed considerably different from, and preferably slower than, that of the spinner belt 14. The best operation seems to be one in which the booster belt travels at about one-third the speed of the spinner-belt; e. g., at about 60 feet per minute when the spinner-belt travels at about 180 feet per minute. With this arrangement, fruit fed to the trough, either from the side as shown, or over the end of the trough, is deposited on the two moving surfaces afforded by belts 14 and 22, and is immediately carried away from the feeding point at a rate at least equal to that of the booster belt. The motion of the booster belt furthermore causes the fruit to settle firmly into the trough against the spinner-belt and spinning of the fruit is thus more positively assured. With a booster belt moving 60 feet per minute and a spinner-belt moving 180 feet per minute, the spinning fruit advances, not at 30 feet per minute as in the stationary back type of trough, but at approximately 90 feet per minute; and since two-thirds of this advancing speed is direct translation, and only one-third of it is induced by the differential or spinning component of the spinner-belt speed, the tendency of the apples to jog up and down or bounce on the spinner-belt is reduced.

Where the booster belt is terminated short of the first ejector 13, as shown, the fruit leaving the booster belt slows down in translational speed and increases in rotational speed as it approaches the ejector 13. Nevertheless, clogging of the trough and flat riding of the apples is avoided, and the accuracy of sizing of the fruit is substantially improved.

The employment of the booster belt, which may be of canvas, or of any other suitable material, preferably of relatively low-friction characteristic, seems also to reduce the jogging of the fruit, which, in the case of stationary back machines, was more pronounced with a high-friction spinning belt than a low-friction one, and thus seems to remove an objection to the use of a high-friction spinner-belt; for example, a scored or like rubber-surfaced belt, as is desirable for other reasons.

Furthermore, the employment of the booster belt 22, in the case of side-fed machines such as that shown in Fig. 1, has an added advantage in preventing bruising of tender-skinned fruit against the back of the trough. And for handling very tender fruit, with heavy feeding, the trough back 12—12a may be cut away under the belt 22 at the feeding area, as shown at 25, so that the belt may yield, and cushion the impact of the fruit thereagainst. This cut-away region, as indicated in Fig. 1, preferably extends throughout the fruit-receiving region measured by the width of the feed conveyor 20, and may even extend a few inches therebeyond as shown. Spring finger or like yielding supporting means (as disclosed in my prior Patent No. 1,925,158 in another connection) may be employed in underlying relation to the portion of the booster belt bridging the gap 25 in the trough back, if desired. The yieldable nature of the belt 22 bridging the gap 25 not only obviates bruising of fruit on impact therewith, but also affords yielding support of fruit deposited near the end of the machine and passing along the feeding area, where other fruit may be deposited against it, and thus minimizes bruising of even the tenderest fruit.

While I have described in detail a preferred embodiment of the invention, it is to be understood that such embodiment is illustrative and not restrictive of the invention, the scope of which is defined in the appended claims. All modifications which come within the meaning and range of equivalency of the claims are therefore intended to be included therein.

I claim as my invention:

1. An improvement in a machine for the sizing of cored fruit by their maximum diameters transverse of their core axes, which machine is of the type having an ejector with a laterally moving surface and a right angled V-shaped sizing trough thereunder with a flat sizing belt traveling on the front wall thereof opposite the ejector so that fruit fed to the trough is caused to spin crown-pulleywise on said belt with its core axis normal to the back wall of the trough and parallel to the plane of the belt while being translated along the trough and presented to the ejector; said improvement residing in the combination, with the back wall of the trough at the feeding area thereof, of a second flat belt mounted to travel along the back wall of the trough and having its surface plane at right angles to that of the sizing belt, with means for driving said second belt in the same direction as said sizing belt and at about one-third the lineal speed thereof, whereby the fruit being fed is rapidly removed from the feeding area and tendency of the fruit to pile up or jog on the sizing belt is reduced.

2. An improvement as defined in claim 1, particularly characterized in that at least one of the two belts, in the feeding area is mounted for yielding movement, thus cushioning the deposit of fruit thereagainst while the two belts provide for rapid removal of the fruit from the feeding area.

EDWIN M. WAYLAND.

REFERENCES CITED

The following references are of record in the file of this patent:

UNITED STATES PATENTS

| Number | Name | Date |
| --- | --- | --- |
| 931,993 | Cary | Aug. 24, 1909 |
| 1,358,061 | Davidson | Nov. 9, 1920 |
| 1,835,889 | McIntyre | Dec. 8, 1931 |
| 1,925,158 | Wayland | Sept. 5, 1933 |
| 2,471,479 | Coons | May 31, 1949 |